US012620102B2

(12) United States Patent
Bendall

(10) Patent No.: US 12,620,102 B2
(45) Date of Patent: May 5, 2026

(54) MEASURING A FEATURE NEAR THE EDGE OF AN OBJECT

(71) Applicant: Baker Hughes Holdings LLC, Houston, TX (US)

(72) Inventor: Clark A. Bendall, Skaneateles, NY (US)

(73) Assignee: Baker Hughes Holdings LLC, Houston, TX (US)

( * ) Notice: Subject to any disclaimer, the term of this patent is extended or adjusted under 35 U.S.C. 154(b) by 259 days.

(21) Appl. No.: 18/449,482

(22) Filed: Aug. 14, 2023

(65) Prior Publication Data

US 2024/0062382 A1      Feb. 22, 2024

Related U.S. Application Data

(60) Provisional application No. 63/371,681, filed on Aug. 17, 2022.

(51) Int. Cl.
  *G06T 7/13*          (2017.01)
  *G06T 7/73*          (2017.01)
(52) U.S. Cl.
  CPC ................. *G06T 7/13* (2017.01); *G06T 7/73* (2017.01); *G06T 2207/20101* (2013.01)
(58) Field of Classification Search
  CPC ... G06T 7/13; G06T 7/73; G06T 2207/20101; G06T 7/60; G06T 7/593; G06T 2207/10012; G06T 2207/30164; G06T 7/12
  See application file for complete search history.

(56) References Cited

U.S. PATENT DOCUMENTS

| 8,960,012 B2 * | 2/2015 | Dunford | ............. G01M 5/0033 |
| | | | 73/779 |
| 9,407,904 B2 * | 8/2016 | Sandrew | .............. H04N 13/271 |
| 10,019,812 B2 * | 7/2018 | Bendall | ...................... G06T 7/62 |
| 10,157,495 B2 * | 12/2018 | Bendall | ...................... G06T 7/62 |
| 10,319,103 B2 * | 6/2019 | Bendall | ...................... G06T 7/62 |
| 10,380,755 B2 * | 8/2019 | Mulukutla | .............. G06T 17/20 |

(Continued)

FOREIGN PATENT DOCUMENTS

| EP | 3428571 B1 | 3/2022 | |
| JP | 2017502411 A | * 1/2017 | ............... B29C 4/40 |

(Continued)

OTHER PUBLICATIONS

European Patent Office, Search Report, 509716-EP-4, Nov. 27, 2025.

*Primary Examiner* — Stephen R Koziol
*Assistant Examiner* — Benedict E Lee
(74) *Attorney, Agent, or Firm* — Mintz, Levin, Cohn, Ferris, Glovsky and Popeo, P.C.

(57) ABSTRACT

A method for measuring a feature near the edge of an object comprising receiving image data characterizing the object, identifying an edge of the object, identifying a point on the perimeter of the feature at a position opposite the edge of the object, determining a reference plane, determining a three-dimensional reference line on the reference plane associated with the edge of the object, determining a three-dimensional measurement point on the reference plane based on the point on the perimeter of the feature, and determining the perpendicular distance from the measurement point to the reference line.

20 Claims, 25 Drawing Sheets

(56)　　　　　　References Cited

U.S. PATENT DOCUMENTS

| 10,551,928 | B2 * | 2/2020 | Mistry | ................. | G06F 3/0485 |
| 11,043,037 | B2 * | 6/2021 | Ebert | ...................... | G06F 18/22 |
| 2015/0249815 | A1 * | 9/2015 | Sandrew | ................. | G06T 17/00 |
| | | | | | 348/47 |
| 2016/0171705 | A1 | 6/2016 | Bendall | | |
| 2016/0196643 | A1 | 7/2016 | Bendall | | |
| 2023/0298203 | A1 * | 9/2023 | Besbes | ...................... | G06T 7/75 |
| | | | | | 382/103 |

FOREIGN PATENT DOCUMENTS

| JP | | 6966997 | B2 | * | 11/2021 | ............. | G01B 11/24 |
| JP | | 7086330 | B2 | * | 6/2022 | ............. | B33Y 30/00 |
| WO | WO-2018232518 | A1 | * | 12/2018 | ............... | G06T 7/55 |

* cited by examiner

*100*

```
┌─────────────────────────────────────┐
│  Receiving one or more two dimensional │──102
│  images characterizing the object    │
└─────────────────────────────────────┘
                  │
                  ▼
┌─────────────────────────────────────┐
│  Determining a plurality of three dimensional │──104
│  surface points on the surface of the object │
│  based on the images                 │
└─────────────────────────────────────┘
                  │
                  ▼
┌─────────────────────────────────────┐
│  Identifying an edge of the object   │──106
└─────────────────────────────────────┘
                  │
                  ▼
┌─────────────────────────────────────┐
│  Identifying a point on a perimeter of the feature │──108
│  at a position opposite the edge of the object │
└─────────────────────────────────────┘
                  │
                  ▼
┌─────────────────────────────────────┐
│  Determining a reference plane based on the │──110
│  identified edge of the object and the three │
│  dimensional coordinates             │
└─────────────────────────────────────┘
                  │
                  ▼
┌─────────────────────────────────────┐
│  Determining a three dimensional reference line │──112
│  on the reference plane associated with the edge │
│  of the object                       │
└─────────────────────────────────────┘
                  │
                  ▼
┌─────────────────────────────────────┐
│  Determining a three dimensional measurement │──114
│  point on the reference plane based on the point │
│  on the perimeter of the feature     │
└─────────────────────────────────────┘
                  │
                  ▼
┌─────────────────────────────────────┐
│  Determining a distance from the measurement │──116
│  point to the reference line         │
└─────────────────────────────────────┘
                  │
                  ▼
┌─────────────────────────────────────┐
│  Providing the determined distance   │──118
└─────────────────────────────────────┘
```

Recall | Measurement               8/16/2022 9:18 AM

105
BLU

_404_

| Views | Measurement Image | Add Measurement | Next Measurement |
| Options ⌃ | Reset | 🔍 Zoom | 🗑 Delete |

400

Recall | Measurement          8/16/2022 9:17 AM

105
BLU

402

404

| Views | Undo | Add Measurement | Next Measurement |
| Delete | | Annotation | Image |

*500*
FIG. 5

400

MTD = 47.1mm 3.84mm
6.26mm

105
BLU

Recall | Measurement     8/16/2022 9:23 AM 602   608   602   604

402

606

404

| Views | Undo | Add Measurement | Next Measurement |

| 🗑 Delete | Annotation | 〰 Image |

1300

| | | | 105 BLU |
|---|---|---|---|
| Length | Point To Line | Depth | Area |
| Mulit-Segment | Depth Profile | Area Depth Profile | Measurement Plane |
| Blade Tip Clearance | Radius Gauge | Blade Edge Nick | |

Recall | Measurement          8/16/2022 9:36 AM

1302

2500

MEASURING A FEATURE NEAR THE EDGE OF AN OBJECT

CROSS-REFERENCE TO RELATED APPLICATION

This application claims the benefit of and priority under 35 U.S.C. § 119 to U.S. Provisional Application No. 63/371, 681 filed Aug. 17, 2022, the contents of each of which are hereby incorporated by reference in their entirety.

TECHNICAL FIELD

This disclosure described technologies relating to field measurements based on images.

BACKGROUND

Video inspection devices, such as video endoscopes or borescopes, are often used to inspect inaccessible areas of industrial assets such as jet engines or gas turbines. These devices may utilize stereoscopic optics or structured light projections to enable measurement of features or damage on the surface of parts within the asset. Such measurements may be used to determine if the asset can continue to operate safely or must be taken out of service for repair.

SUMMARY

This disclosure relates to measuring a feature near the edge of an object.

An example of the subject matter described within this disclosure is a method with the following features. One or more two dimensional images characterizing an object are received. Multiple three-dimensional surface points on the surface of the object are determined based on the images. An edge of the object is identified. A point on a perimeter of the feature at a position opposite the edge of the object is identified. A reference plane is determined based on the identified edge of the object and the three-dimensional coordinates. A three-dimensional reference line on the reference plane associated with the edge of the object is determined. A three-dimensional measurement point on the reference plane is determined based on the point on the perimeter of the feature. A distance between the measurement point and the reference line is determined. The determined distance is provided.

The disclosed method can be implemented in a variety of ways. For example, within a system that includes at least one data processor and a non-transitory memory storing instructions for the processor to perform aspects of the method. Alternatively or in addition, the method can be in included non-transitory computer readable memory storing the method as instructions which, when executed by at least one data processor forming part of at least one computing system, causes the at least one data processor to perform operations of the method. In some implementations, such a system can be a measurement device with the following features. An image is sensor configured to generate two-dimensional image data based on light reflected from a surface of an object. A data processor configured to determine a plurality of three-dimensional surface points on the surface of the object based on the two-dimensional image data. A A display is configured to display, within a graphical users interface, a visual representation of the object based on the two dimensional image data. A user input device can be included. In addition, the aforementioned processor and non-transitory memory can also be included with such a system.

Aspects of the example method, which can be combined with the example method alone or in combination with other aspects, include the following. The one or more two dimensional images include a stereo image pair or a structured light image.

Aspects of the example method, which can be combined with the example method alone or in combination with other aspects, include the following. Identifying an edge of the object includes receiving, by a user-input device, a first user interaction designating a first edge point proximate the edge of the object.

Aspects of the example method, which can be combined with the example method alone or in combination with other aspects, include the following. Identifying an edge of the object comprises receiving, by the user input device, a second user interaction designating a second edge point proximate the edge of the object.

Aspects of the example method, which can be combined with the example method alone or in combination with other aspects, include the following. Identifying an edge of the object includes applying edge detection techniques to map the edge.

Aspects of the example method, which can be combined with the example method alone or in combination with other aspects, include the following. Identifying a point on the perimeter of the feature comprises receiving, by the user input device, a third user interaction designating the position of the point.

Aspects of the example method, which can be combined with the example method alone or in combination with other aspects, include the following. Determining a reference plane includes identifying three or more of the three-dimensional surface points on the surface of the object based on the position of the identified edge of the object.

BRIEF DESCRIPTION OF DRAWINGS

FIG. 1 is a flowchart of an example method that can be used with aspects of this disclosure.

FIG. 5 is an example graphical user's interface showing the 2D image on the left and the rendered 3D point cloud view on the right.

DESCRIPTION

Figure 2:
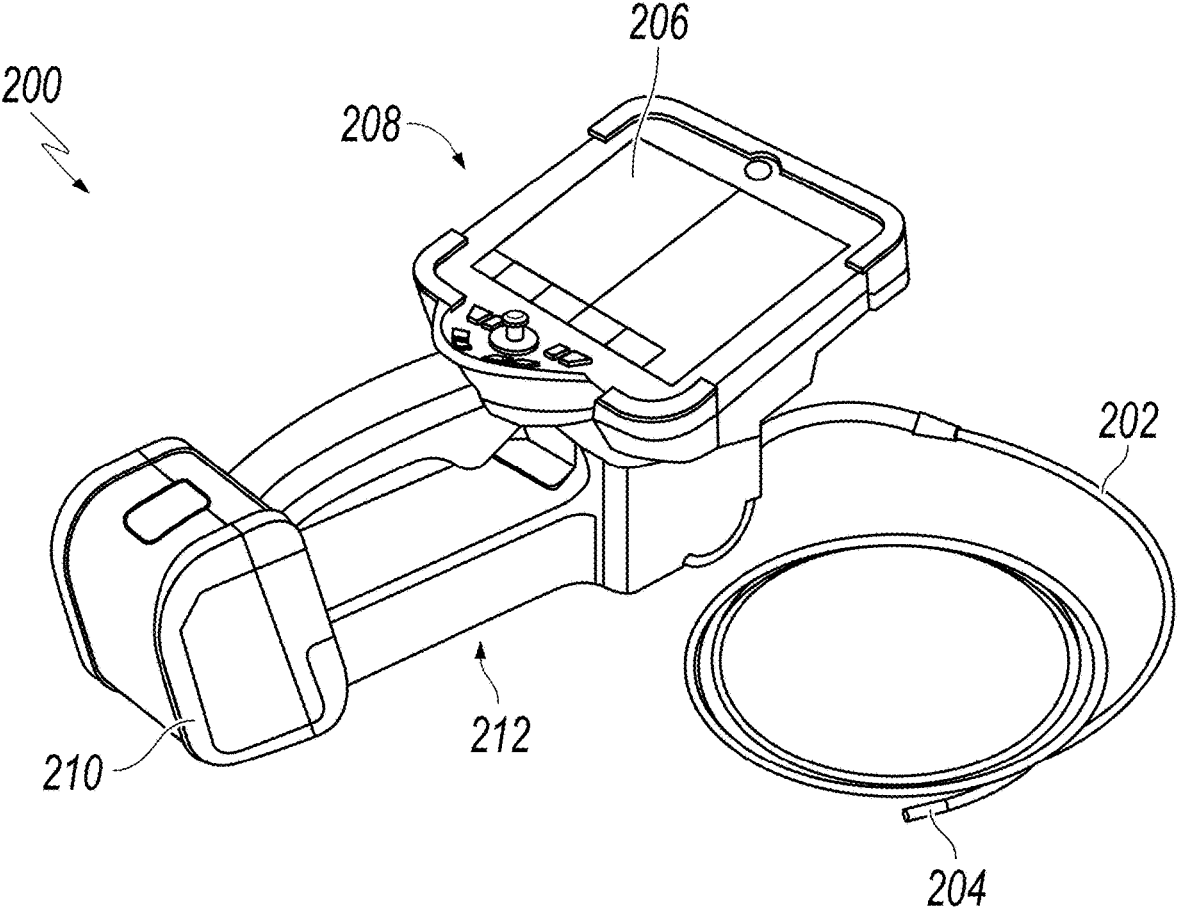
FIG. 2 is an example borescope that can be used with aspects of this disclosure.

Certain embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting embodiments and that the scope of the present invention is defined solely by the claims. The features illustrated or described in connection with one embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

During visual inspection of gas-turbine engines, blade edge damage is measured using a visual inspection device with 3D measurement capability using a point-to-line measurement function, such as a borescope. The device includes a display on which an image of the blade including the damage is displayed within a graphical user's interface. The user can position two measurement cursors on the edge of the blade and a third measurement cursor on the edge of the damage furthest from the blade edge. The positioning of these three cursors may be done via first, second, and third user interactions using a user input device such as a touch screen, joystick, buttons, a mouse, etc. Each cursor may be placed on a pixel of the displayed 2D image. The data processor can then determines a 3D coordinate on the blade surface associated with each cursor. In some implementations, the 3D coordinate can be determined before or after each cursor is placed based on the 2D image pixel on which the cursor is placed. The data processor can use the 3D coordinates associated with the first two cursors to establish a 3D reference line. The distance, for example, a perpendicular distance, between the references line and the 3D coordinate associated with the third cursor can then be computed. For this approach to give accurate results, the data processor must be able to compute a 3D coordinate at each cursor location that accurately represents the surface of the blade. However, it is often the case that the data processor is either unable to determine a 3D coordinate or that the 3D coordinates do not accurately represent the surface of the blade, especially along its edge. This is especially true with shiny blades in the compressor section (s) of the engine. A further issue with this type of measurement is that when the blade edge has a significant radius, the measurement may include a portion of that radius in the measured result thus over stating the size of the damage. For all these reasons, such measurements are often inaccurate and can lead to incorrect decision making about the serviceability of the engine.

This disclosure describes measuring a feature near the edge of an object. In some implementations, damage that occurs when a foreign object passes through a jet engine or gas turbine is measured. This damage often occurs along a leading (oriented toward the air inlet end) or trailing edge (oriented toward the exhaust end) of a rotating airfoil or blade in a compressor or turbine section. Such damage, commonly referred to as a nick, nick, or ding, can create stress concentrations that can lead to cracking and eventual release of a portion of the blade, which can cause catastrophic damage to the down-stream sections of the engine. The engine maintenance manuals typically include serviceability limits based on the engine stage, axial position of the damage on the blade (distance from the root or tip), and distance from the blade edge to the inner-most edge of the damage (blade edge damage). If the damage exceeds the serviceability limit, further action may be required such as additional inspections at a shorter service interval, removal from service to be opened and repaired, or in-situ repair via boro-blending.

An example of such a method 100 is illustrated in FIG. 1. At 102, one or more two dimensional images characterizing an object are received. Such images can be received, for example from a borescope or other inspection device. In some implementations, the images contain data characterizing three-dimensional surface points of the characterized object. Such data can be provided by the inspection device or can be determined from multiple two dimensional images taken a known distance apart from one another (e.g. stereoscopic) or from one or more images that include structured-light patterns projected onto the surface of the object.

Regardless of how such data is acquired, at 104, multiple three-dimensional surface points on the surface of the object are determined based on the images.

At 106, an edge of the object is identified. The edge of the object can be identified based on the provided two dimensional images, the multiple three-dimensional surface points, or a combination of the two. The identification can be performed by, in some implementations, a controller that includes a processor and non-transitory memory.

At 108, a point on a perimeter of a feature, at a position opposite the edge of the object, is identified. Such a feature can include a defect, such as a nick in a turbine blade edge. In such an example, the position opposite the edge of the object can be a valley of the nick within the turbine blade edge. In other words, the point on the edge of nick is the point furthest from the turbine blade edge.

At 110, a reference plane is identified based on the identified edge of the object and the three-dimensional coordinates. At 112, a three-dimensional reference line on the reference plane associated with the edge of the object is determined. At 114, a three-dimensional measurement point on the reference plane is determined based on the point on the perimeter of the feature. Such identifications and determinations can be performed by, in some implementations, a controller that includes a processor and non-transitory memory.

At 116, a distance between the measurement point and the reference line is determined. In some instances, the distance can be a perpendicular distance. At 118, the determined distance is provided. The distance can be provided, for example to a display screen to be seen and interpreted by a user. Alternatively or in addition, the distance can be provided to another program or device for analysis and/or storage. More details on the method 100 and an example of an execution of method 100 are described throughout this disclosure.

Industrial video inspection devices such as video endoscopes or borescopes are often used to inspect industrial assets such as jet engines and gas turbines. Such video inspection devices typically include an elongated, often flexible, insertion tube having an image sensor and optics, a light source for delivering light to the inspection site, and a proximal control unit that includes a data processor coupled to volatile and non-volatile memory, a display, one or more user input devices such as a touch screen, joystick, buttons, etc., and has various input/output facilities such as USB, Ethernet, Wi-Fi networking, Bluetooth, etc. An example borescope 200 device is shown in FIG. 2. The video borescope device 200 has an elongated insertion tube 202, the tip 204, with camera optics and an illumination system for supplying light to the inspection location, a touch display 206, a user interface 208, a battery, and a controller 2500 (See FIG. 25) within the borescope housing 212. The controller is described in greater detail later within this disclosure.

In some implementations, the video borescope device 200 includes the ability to make three-dimensional (3D) measurements of surface features on viewed objects.

Such an implementation may use stereoscopic optics that provide a stereoscopic image pair from which 3D coordinates on the object surface may be determined using a data processor. In some implementations, a structured-light projection system can be included to project phase shifted sinusoidal line patterns, laser lines, dots, etc. onto the surface such that images of the projected pattern reflected from the object surface may be processed by the data processor utilizing calibration data that characterizes the optical and projection systems to determine multiple 3D coordinates on the surface of the object. In some implementations the 3D coordinates may be determined before the user begins the measurement process. In some implementations, the 3D coordinates can be determined after measurement cursors are placed by a user. Each 3D coordinate can be associated with a pixel of a 2D image of the viewed object. The 3D coordinates can then be used to measure surface features.

Figure 3:
FIG. 3 is an example rendered 3D point cloud view showing noise and artifacts in the 3D data representing the blade.
Figure 4:
FIG. 4 is an example 2D image of a compressor blade having edge damage (nick).

In some instances, there are pixels of the 2D image at which the data processor cannot determine a 3D coordinate. When using stereoscopic images, there may be insufficient surface detail for the data processor to find corresponding pixels in both images or there may be a closer surface that obscures some points in one of the images. When using structured light projections, there may be areas not illuminated by the projected pattern(s) or the intensity of the reflected pattern may be insufficient. Such inspection devices can have small dimensions to allow access through inspection ports in the asset. Such dimensions can mean that the triangulation angle between stereo views or between a pattern projection point and the camera optics is quite small resulting in noise or artifacts in the 3D coordinates that are not representative of the true surface of the viewed object and can cause significant measurement error. Such artifacts can occur near the edges of parts where optical halo or glare can occur, especially with shiny parts. Furthermore, it can be difficult for such systems to determine 3D data that accurately represents a radiused edge due to area-based pixel matching (stereo) and/or area-based filtering to reduce noise in the 3D data. These factors all combine to make measurements near part edges particularly prone to having large inaccuracies or measurement errors. FIG. 3 illustrates such noise/artifacts along the edge of a shiny compressor blade with a rendered 3D point cloud view 300 showing noise and artifacts in the 3D data representing the blade 404. FIG. 4 shows an example of a nick 402 on the edge of a compressor blade 404 displayed in a 2D image 400, and FIG. 5 shows a user interface illustrating both a 2D image and a rendered 3D point cloud view 300 within the same interface 500.

Figure 6:
FIG. 6 illustrates an example point-to-line measurement.
Figure 7:
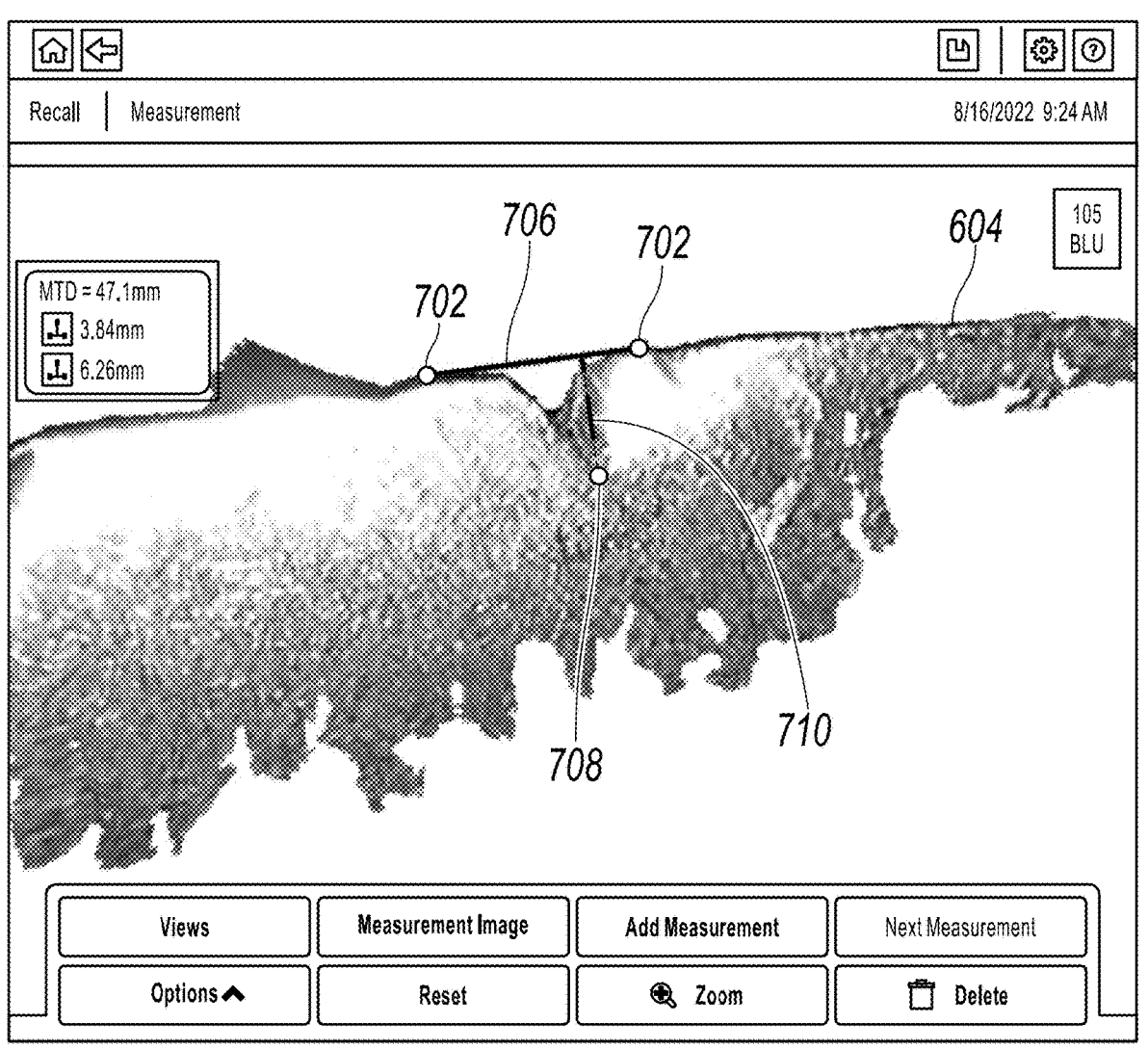
FIG. 7 illustrates an example point-to-line measurement shown in the rendered 3D point cloud.
Figure 8:
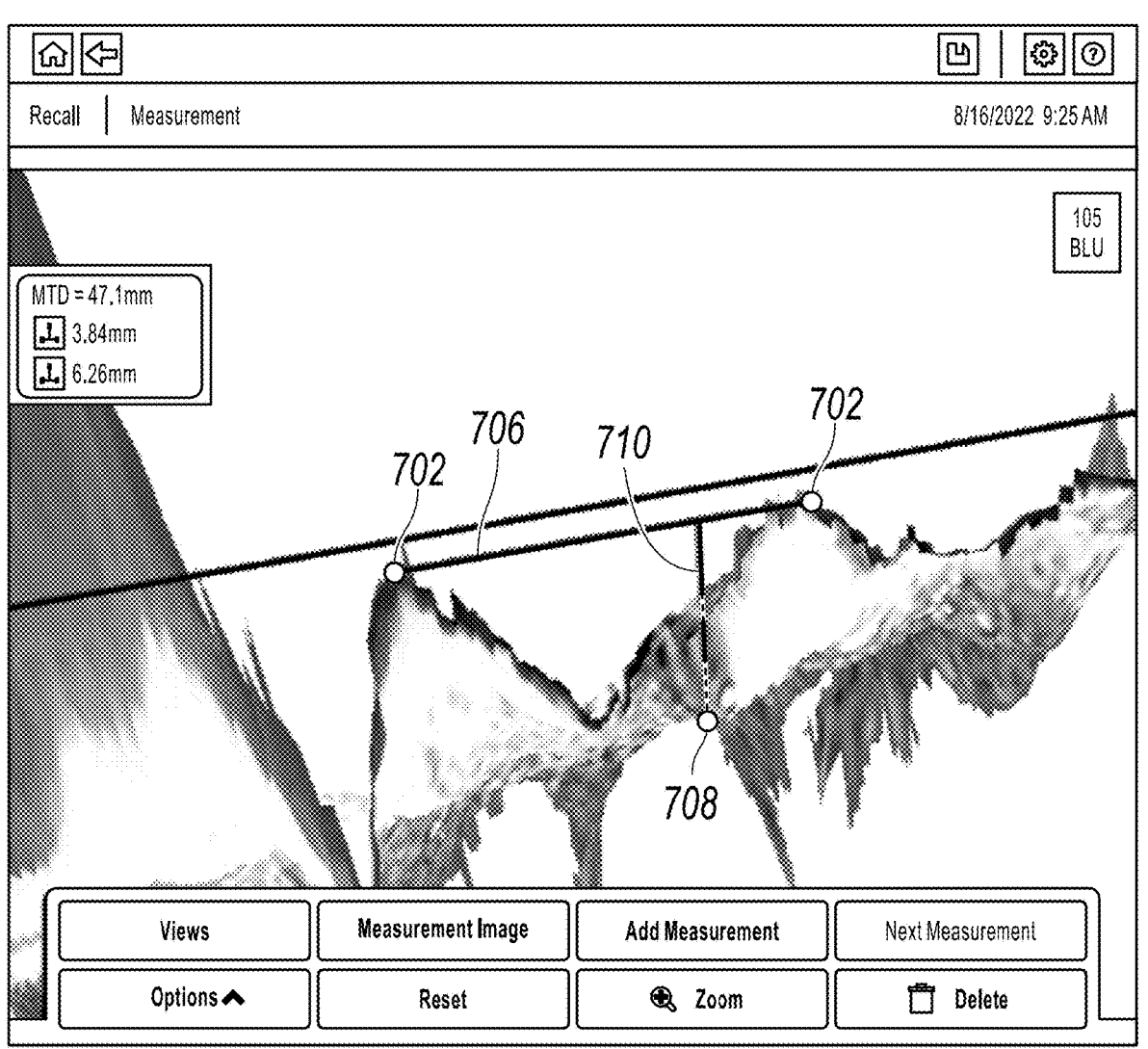
FIG. 8 is the same 3D point cloud data shown in FIG. 6 rendered from a different perspective.

FIG. 6, FIG. 7, and FIG. 8 show an example of a point-to-line measurement that is affected by noise/artifacts along the blade edge. As shown in FIG. 6, a point-to-line measurement is shown with two cursors 602 placed on the edge 604 of the blade 404 to select 3D coordinates on the blade edge 604 that define a 3D reference line 606 and a third cursor 608 manually placed on the edge of the damage furthest from the blade edge. The 3.84 mm result is the perpendicular distance from the 3D reference line 606 to the 3D coordinate associated with the pixel at which the third cursor 608 is located. Moving on to FIG. 7, a point-to-line measurement is shown in the rendered 3D point cloud view via the addition of cursors (702. 708) at the 3D coordinates associated with the three measurement cursors (602. 608). More specifically a measurement can be taken between a line 706 defined by the first two cursors 702 near the blade edge 604 (representing the 3D reference line 606) and the third cursor 708, defining a second line 710 extending between the 3D reference line 706 and the third cursor 708. FIG. 8 illustrates the same 3D point cloud data shown in FIG. 6 rendered from a different perspective. As can be seen in the figure, the cursors (702, 708) located on surface points are affected by 3D noise/artifacts along the blade edge.

To address the shortcomings of such point-to-line measurement, Bendall in U.S. Pat. No. 10,586,341B2 (hereby incorporated by reference) describes a method wherein a reference surface (referred to herein as a measurement plane or Measurement Plane) is established using a set of points on the object surface and projecting the 3D coordinates associated with other measurements, such as point-to-line measurements, onto the plane before computing the measurement results. The projecting of the points is done by using calibration data that characterizes a pixel ray (essentially a 3D vector) of each pixel to determine the 3D coordinate of the intersection of each cursor's pixel ray with the measurement plane. Thus, the 3D coordinate associated with the cursor location in the 2D image is not actually used in calculating the measurement result, which allows cursors to be placed even where the data processor is unable to determine a 3D coordinate. This method greatly reduces the impact of noise, artifacts, or gaps in the 3D data and can eliminate the measurement component that results from the radius of the blade edge. This method requires the user to place additional cursors (for example, three) on the surface to identify which points should be used to determine the measurement plane. While this gives the user a high level of control over the determination of the plane, it is more time consuming and requires that the user understand the interaction between the measurement plane and other measurement tools (e.g. point to line, point to point, point to plane, etc.). When the surface on which the measurement plane is to be established is curved, as is often the case with turbine blades, such a method can also introduces variability due to inconsistencies in where the user places the measurement plane cursors on the curved surface. So, while using a measurement plane can improve some aspects of blade edge damage measurements, it still has shortcomings.

Figure 9:
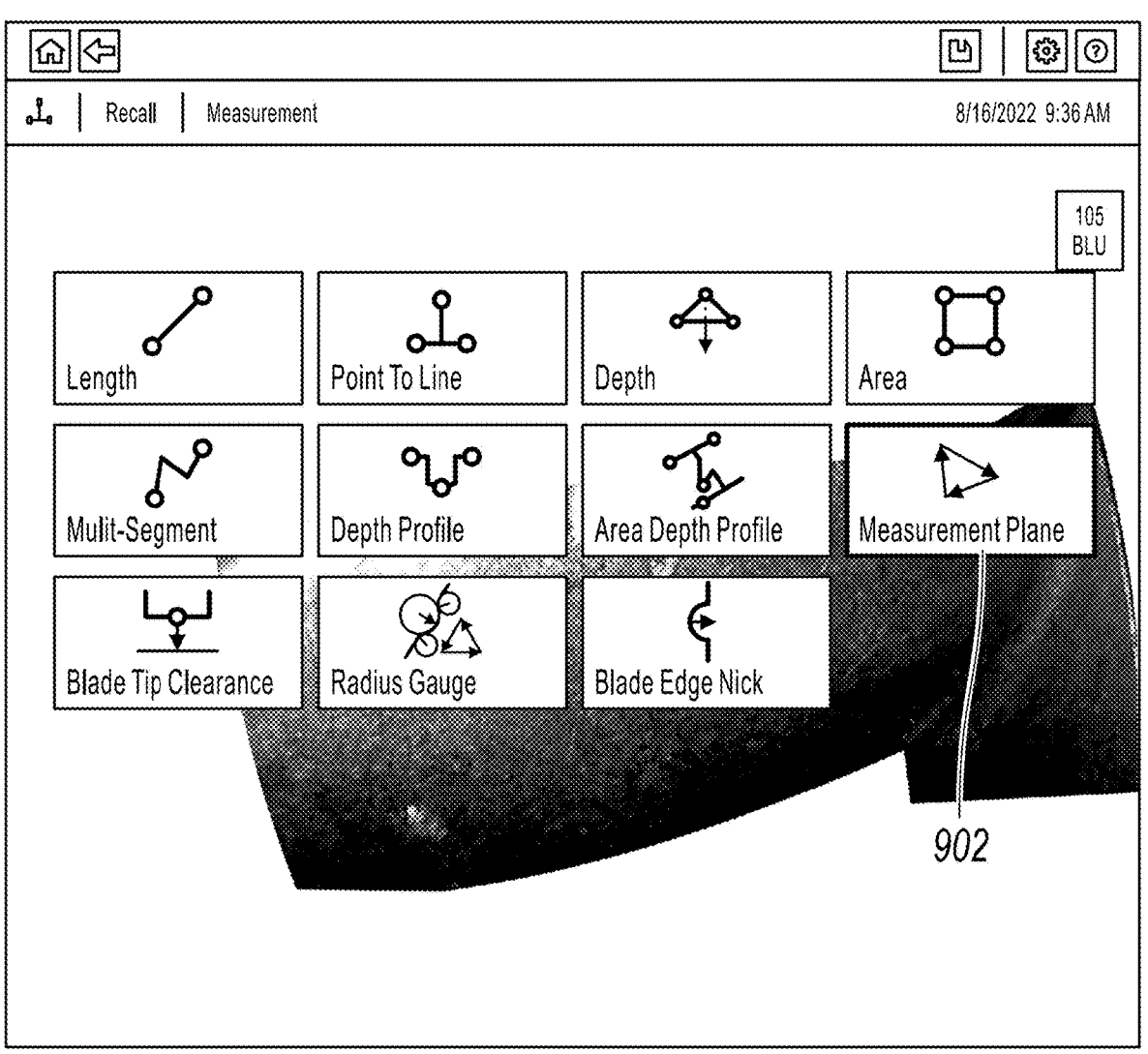
FIG. 9 is an example graphical user interface showing the selection of a Measurement Plane function.
Figure 10:
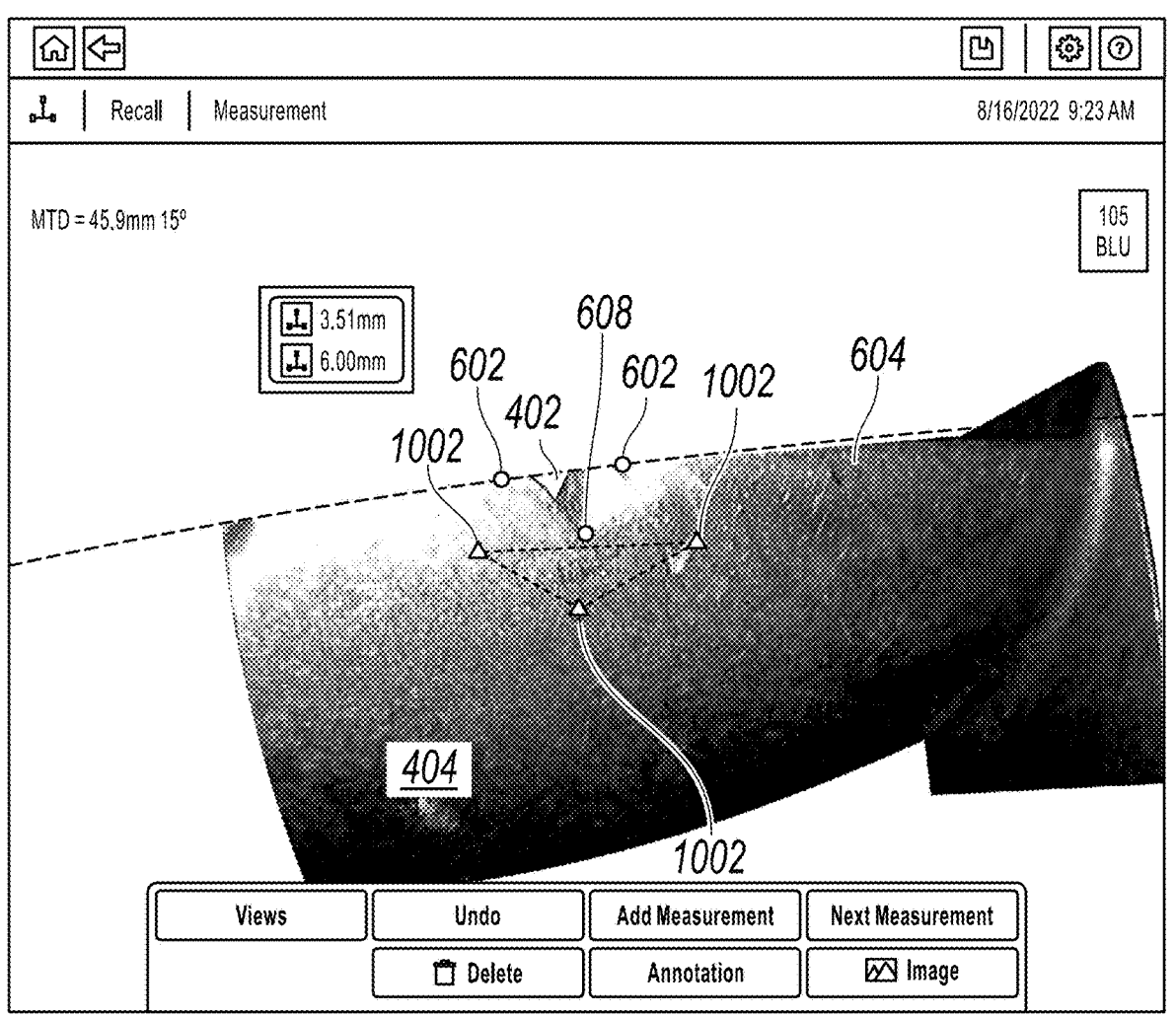
FIG. 10 is an example 2D image showing Measurement Plane cursors.
Figure 11:
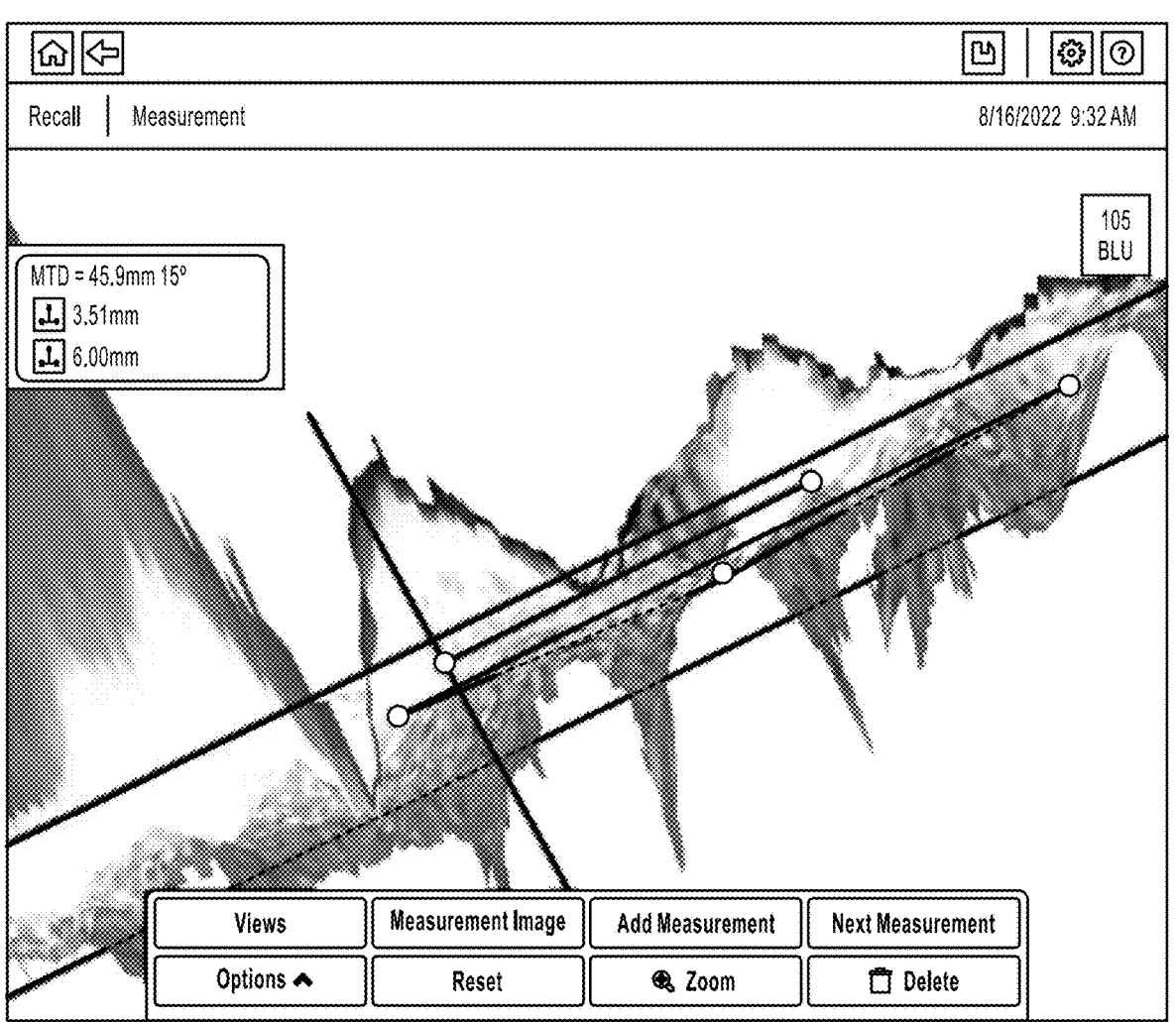
FIG. 11 is an example rendered 3D point cloud showing the point-to-line measurement cursors projected onto the Measurement Plane rather than being located on the 3D surface of the blade as shown in FIG. 6.
Figure 12:
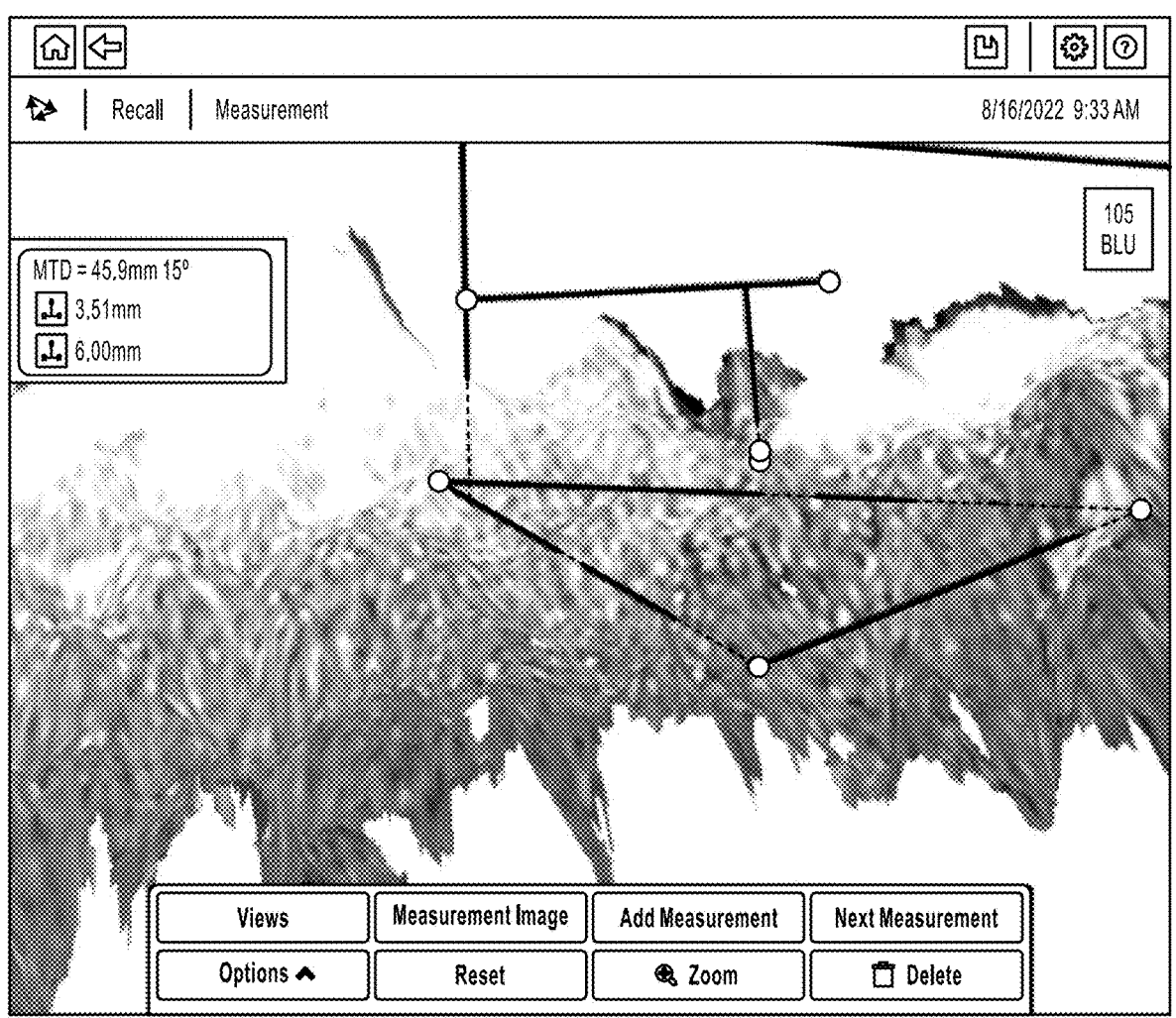
FIG. 12 is the same 3D point cloud data as shown in FIG. 11 rendered from a different perspective

FIG. 9 through FIG. 12 show an example of using a measurement plane in combination with a point-to-line measurement to reduce the impact of the 3D noise/artifacts on the point-to-line measurement. FIG. 9 illustrates a graphical user interface 900 showing the selection of a Measurement Plane function 902. FIG. 10 shows a 2D image with Measurement Plane cursors 1002 placed on the surface of the blade 404 to establish a 3D plane tangent to the blade surface slightly inboard from the blade edge. FIG. 11 shows the rendered 3D point cloud with the cursors associated with a point-to-line measurement projected onto the Measurement Plane rather than being located on the 3D surface of the blade as shown in FIG. 6. Such a change in datum results in a change in the measured result from 3.84 mm to 3.51 mm. FIG. 12 shows he same 3D point cloud data as shown in FIG. 11 rendered from a different perspective showing more clearly that the cursors associated with the point-to-line measurement are offset from the 3D surface data due to the use of the Measurement Plan.

The subject matter described herein preserves the simplicity of a three-cursor point-to-line measurement while providing the same benefits as the measurement plane of reduced impact from noise, artifacts, or data gaps without the variability from user-positioned measurement plane cursors on curved surfaces. In some implementations, the user places two cursors on the edge of the blade and a third cursor on the edge of the damage furthest from the edge of the blade, much like a standard point-to-line measurement. This indicates to the data processor the position of the blade edge in the 2D image and on which side of the blade edge the surface of the blade is located (the side including the 3rd cursor). The data processor identifies a set of points on the surface of the blade and determines a reference plane tangent to the blade surface at an approximate predetermined distance from the blade edge. The data processor then utilizes the same method as described above with the measurement plane to determine a projected point for each cursor, which is the 3D coordinate at which the pixel ray of the pixel on which the cursor has been placed intersects the reference plane. The data processor then determines a reference line on the reference plane based on the projected points associated with the two cursors placed on the blade edge (projected edge points) and computes the perpendicular distance from that reference line to the projected point associated with the cursor placed on the edge of the damage furthest from the blade edge (projected measurement point).

Figure 13:
FIG. 13 is an example graphical user interface menu showing the selection of an example "Blade Edge Nick" function.
Figure 14:
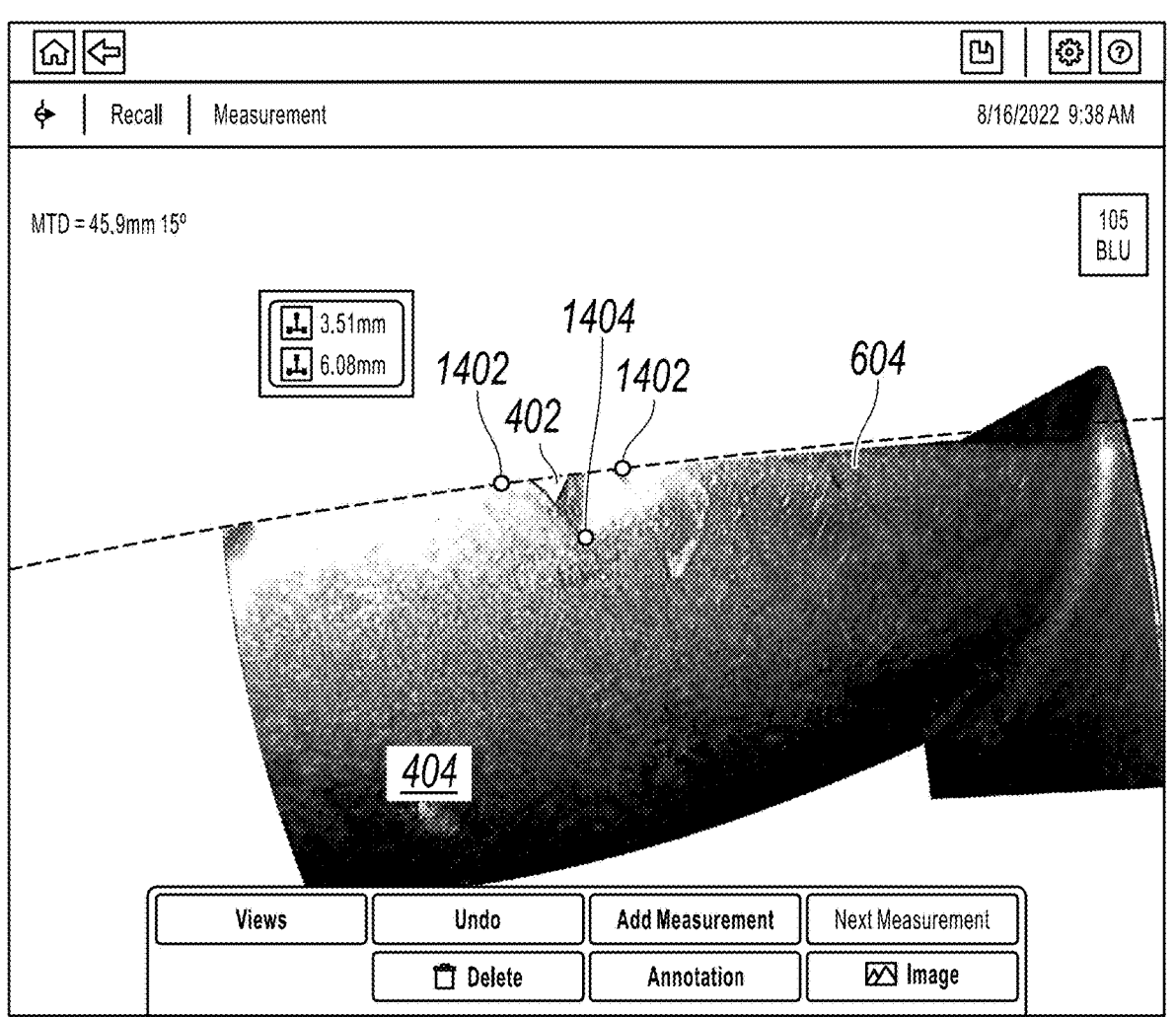
FIG. 14 shows an example with three cursors of the example "Blade Edge Nick" measurement placed on the 2D image.
Figure 15:
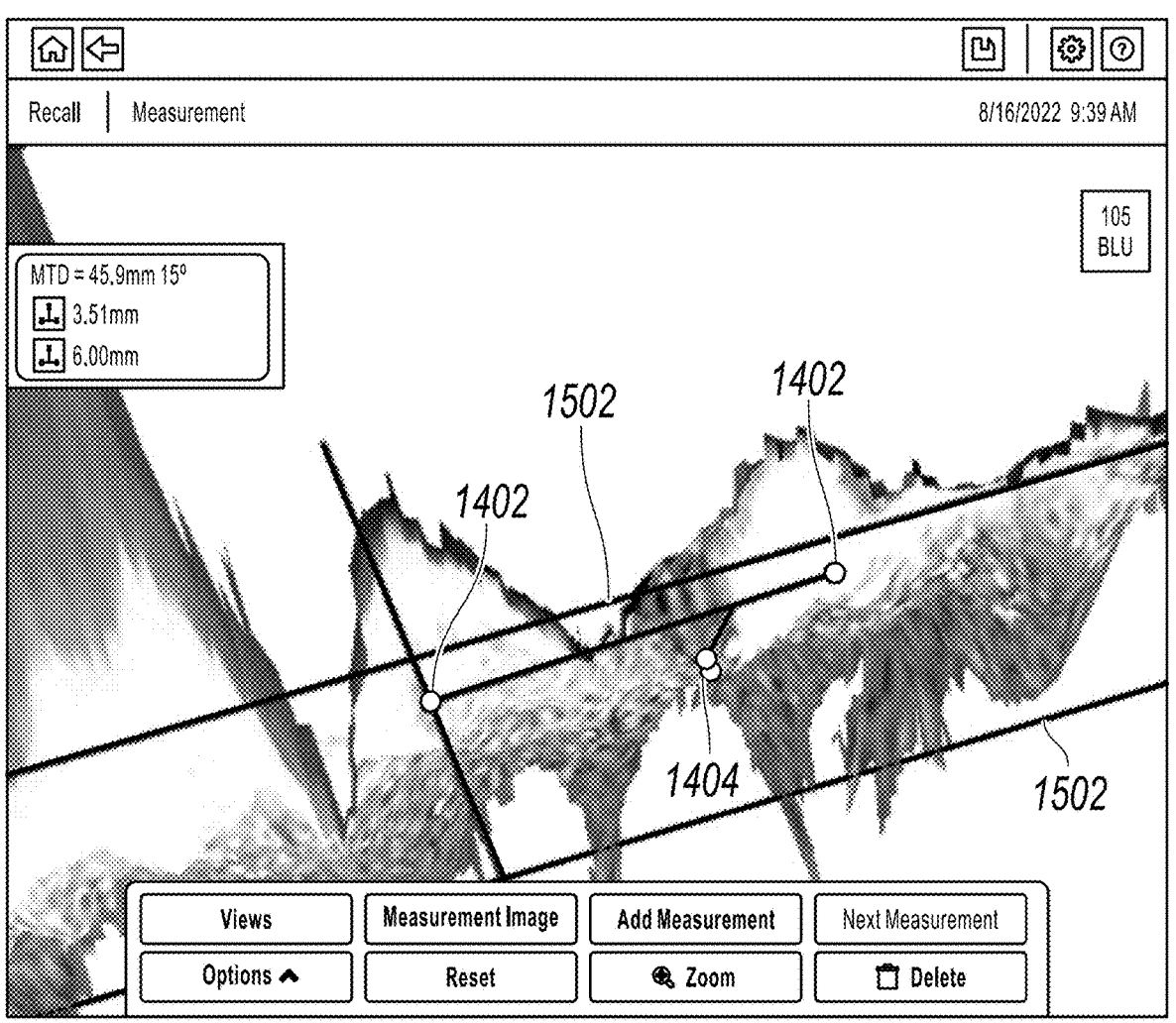
FIG. 15 is an example rendered 3D point cloud view showing the "Blade Edge Nick" measurement cursors projected onto an automatically-determined reference plane.
Figure 16:
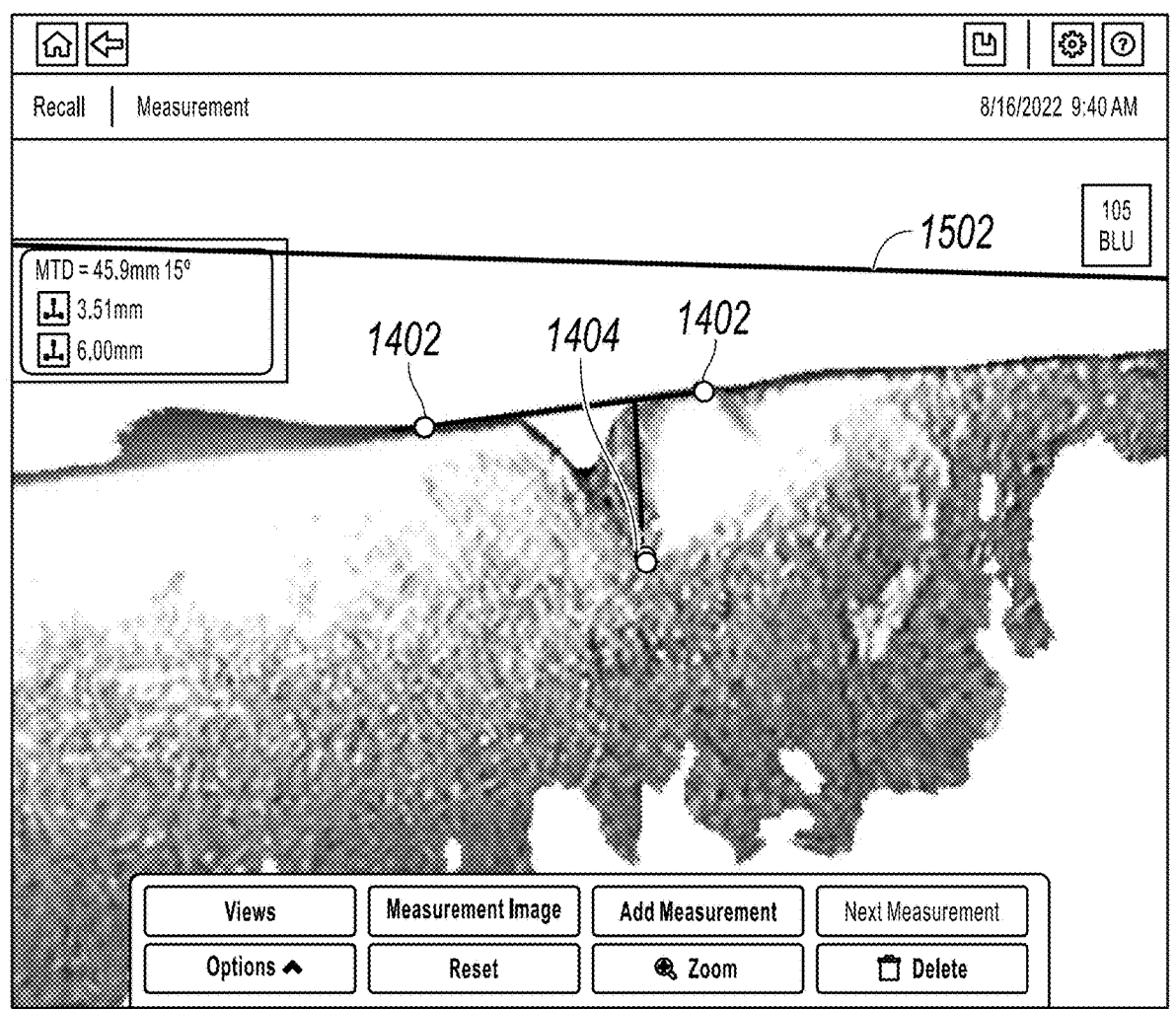
FIG. 16 is the same 3D point cloud data as shown in FIG. 15 rendered from a different perspective.
Figure 17:
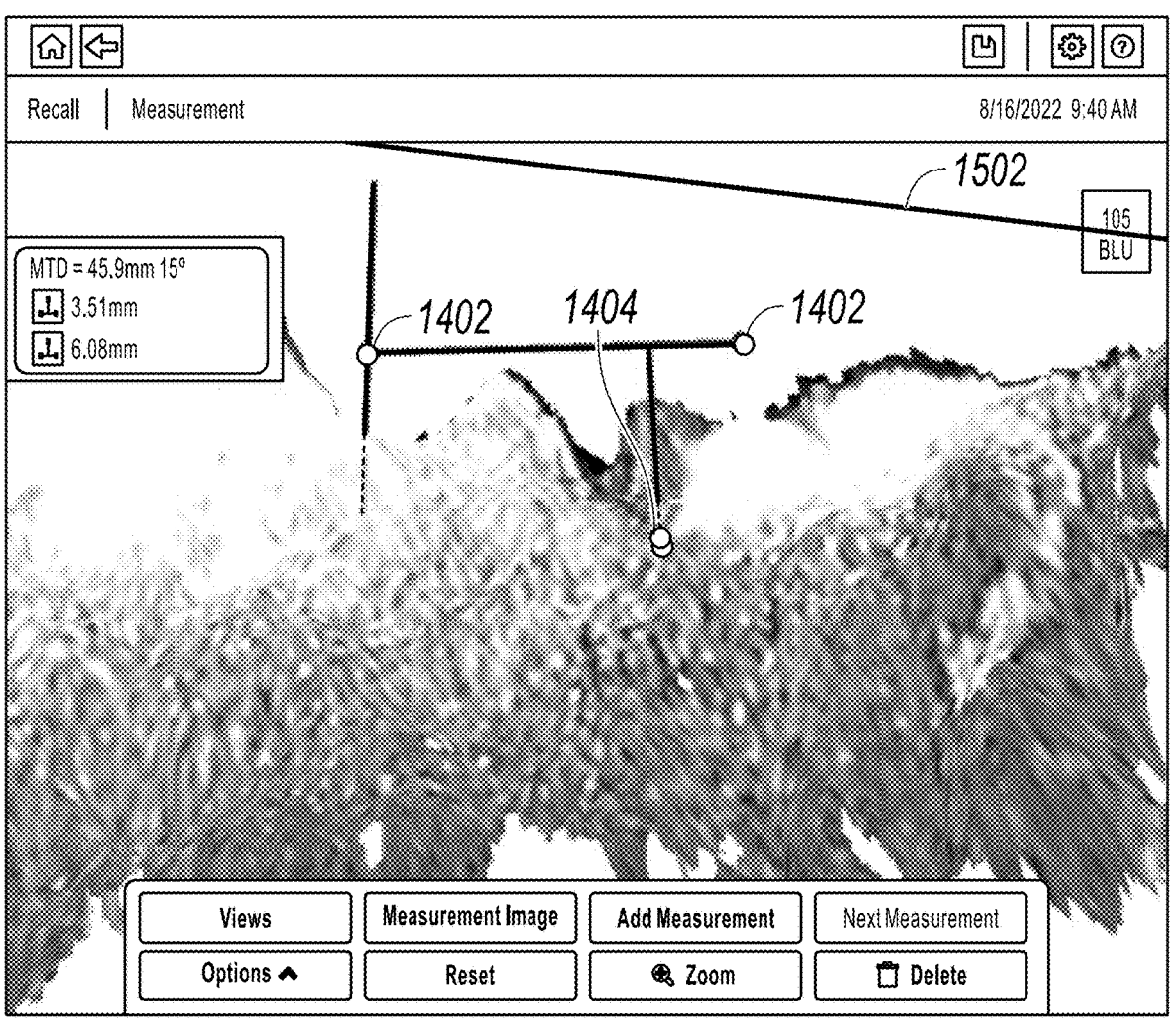
FIG. 17 is the same 3D point cloud data as shown in FIG. 15 and FIG. 16 rendered from a different perspective.
Figure 18:
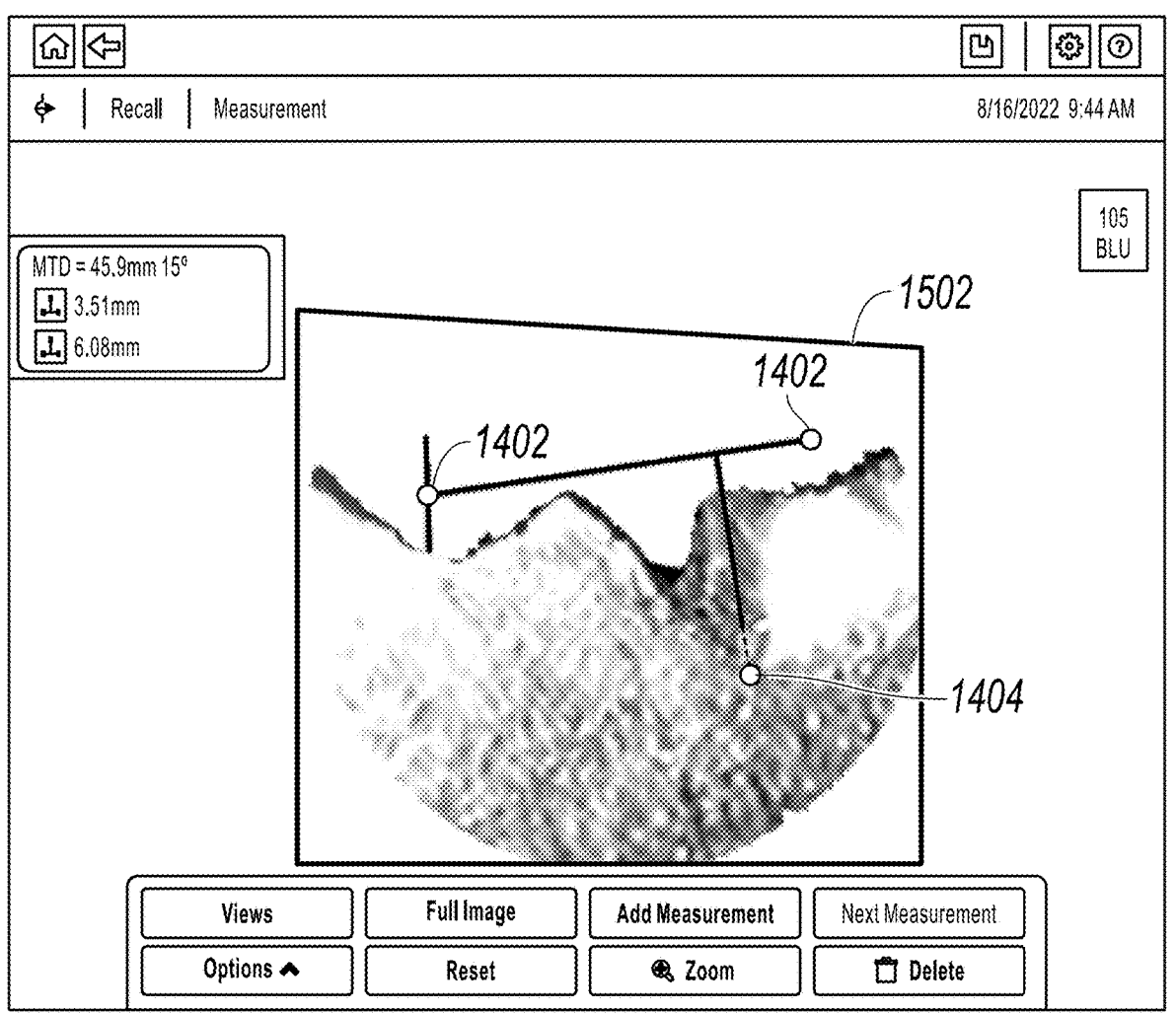
FIG. 18 is an example of an alternate 3D point cloud rendering in which only 3D surface points within a region of interest around the exemplary "Blade Edge Nick" measurement cursors are shown.

FIG. 13 through FIG. 24 illustrate various aspects of an implementation of the subject matter described within this disclosure. FIG. 13 shows an example graphical user interface menu 1300 showing the selection of a "Blade Edge Nick" function 1302. After this tool is selected, as shown in FIG. 14, three cursors of the "Blade Edge Nick" measurement too are placed on the 2D image. More specifically, there are two cursors 1402 used to identify the edge 604 of the blade 404, and another cursor 1404 to mark a "peak" of the nick 402. In other words, the point most opposite the edge 604. FIG. 15 shows a 3D point cloud view with the cursors (1402, 1404) associated with the exemplary "Blade Edge Nick" measurement projected onto an automatically-determined reference plane 1502 rather than being located on the 3D surface of the blade 404 as previously described in reference to FIG. 7. Note the similarity with the Measurement Plane based measurement of FIG. 10 including the same measured result of 3.51 mm. Looking at an alternative perspective of FIG. 16, the cursors (1402, 1404) appear to be well placed on the plane 1502. Looking again to another perspective shown in FIG. 17, it is more apparent that the cursors (1402, 1404) associated with the "Blade Edge Nick" measurement tool are spaced off the 3D surface data due to their projection onto the reference plane 1502. FIG. 18: Shows an alternate 3D point cloud rendering in which only 3D surface points within a region of interest around the exemplary "Blade Edge Nick" measurement spheres are shown. Also visible is the reference plane 1502.

Figure 20:
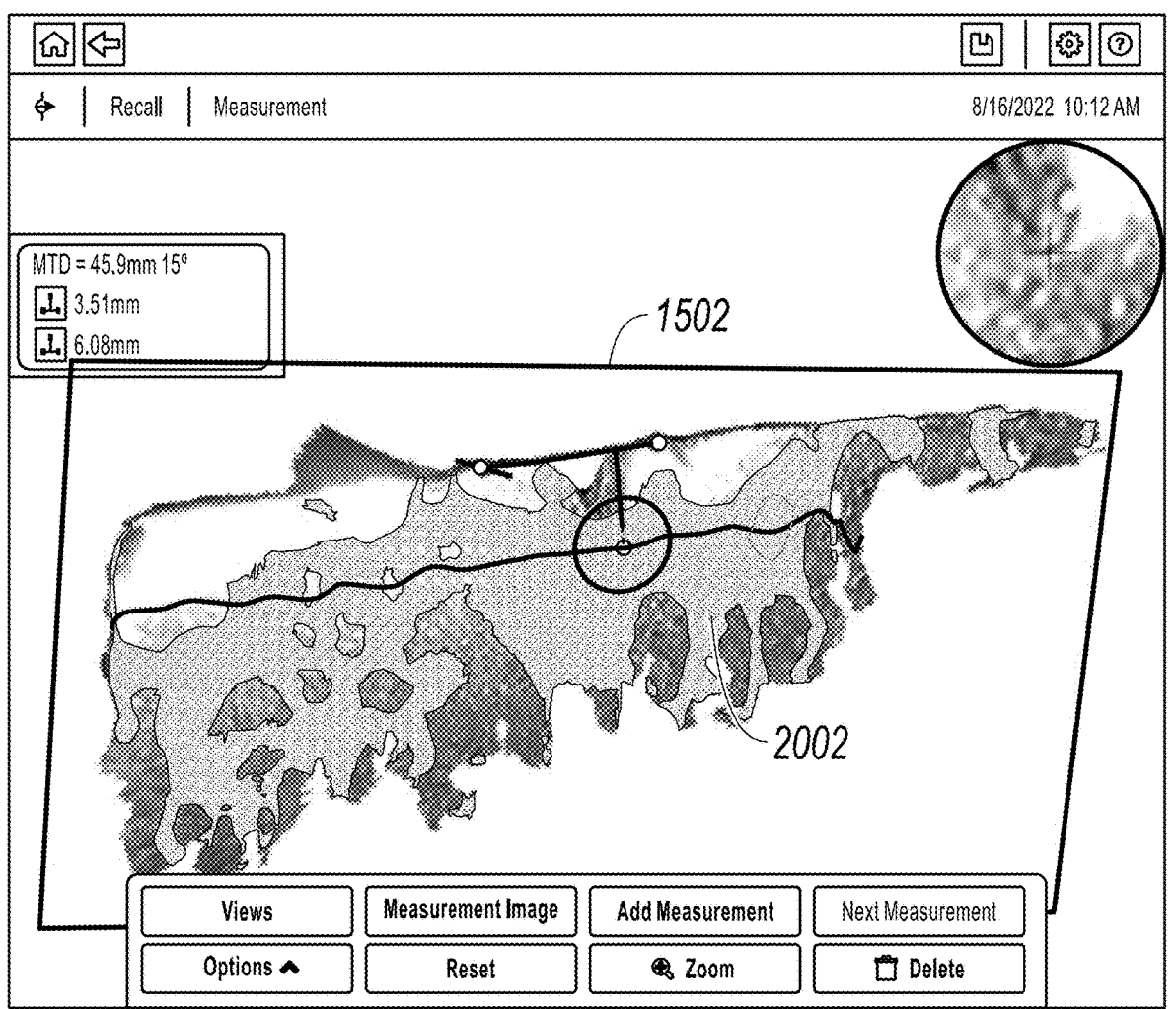
FIG. 20 illustrates an example masking of 3D surface points in the rendered 3D point cloud that are within a predetermined distance from the exemplary "Blade Edge Nick" measurement's reference plane.
Figure 21:
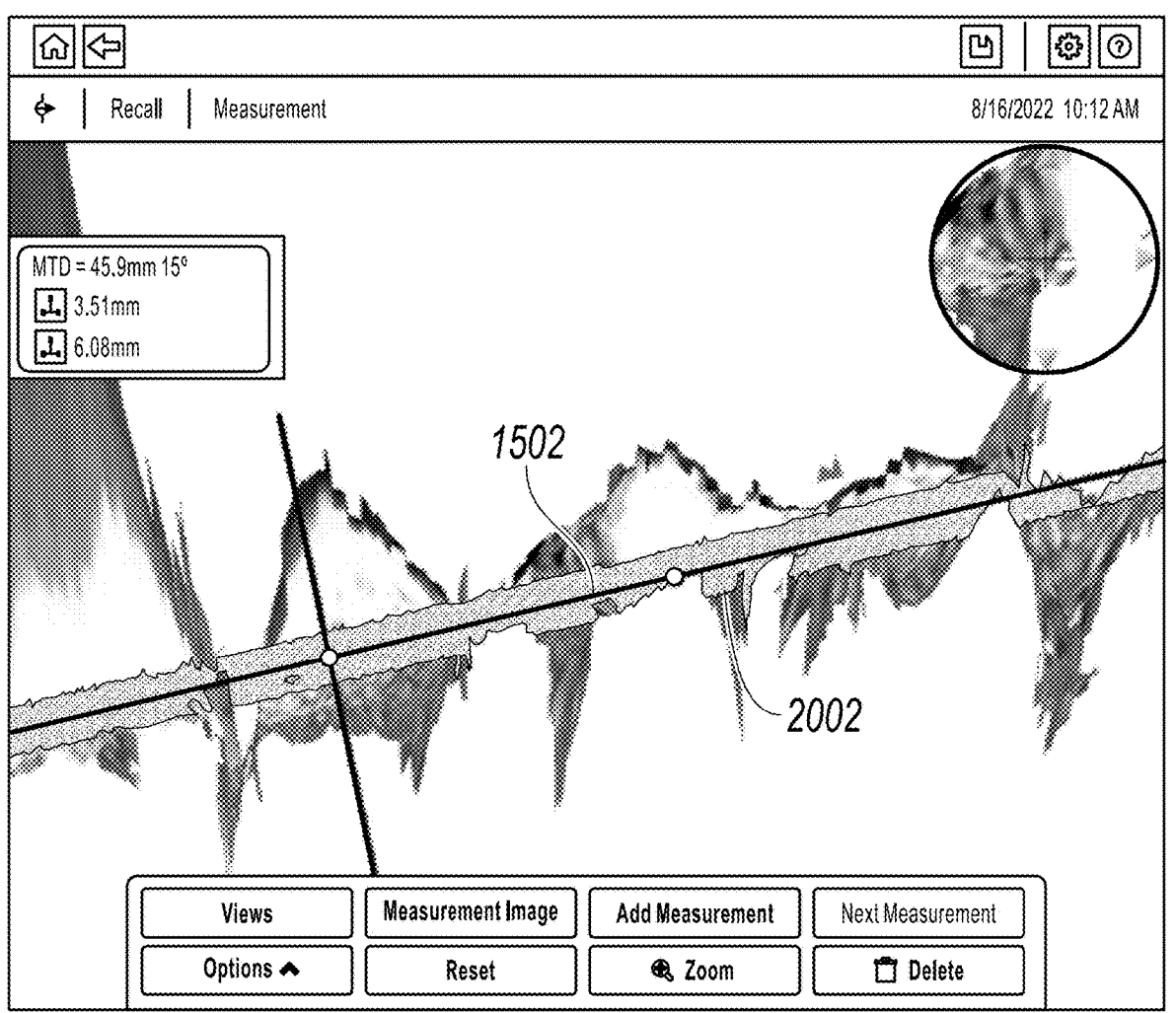
FIG. 21 illustrates the same 3D data as shown in FIG. 20 rendered from an alternate perspective.

FIG. 20 highlights 3D surface points 2002 in the rendered 3D point cloud that are within a predetermined distance from the "Blade Edge Nick" measurement's reference plane 1502, for example, within 1% of the z value of each point. FIG. 21 is similar to FIG. 20, just rendered from a perspective parallel and in-line with the plane 1502. A band of highlighted points 2002 can be seen centered on the reference plane 1502.

In some implementations, the data processor may utilize edge detection, machine vision, or machine learning techniques to automatically map the edge of the blade in the 2D image thus eliminating the need for the user to place cursors on the edge of the blade. For example, the data processor may implement a Canny edge detector in combination with a Hough transform to identify possible blade edges. The data processor can then evaluate the 3D surface points to identify which of the possible blade edges appears to be a real blade edge. Alternatively, machine learning may be applied to identify the blade edge. For example, a series of labeled images including blade edges may be used to train a neural network to identify blade edges in other images. The data processor, having identified the blade edge, may then determine a set of projected edge points on the reference plane. The data processor may automatically place two or more cursors on the mapped edge of the blade to allow the user to adjust the positions of those cursors if needed.

In some implementations, the data processor may utilize edge detection, machine vision, or machine learning techniques to automatically identify damage near the blade edge and identify a point on the edge of the damage furthest from the blade edge. The data processor may automatically place a cursor at that point to allow the user to adjust the position of the cursor if needed.

Figure 19:
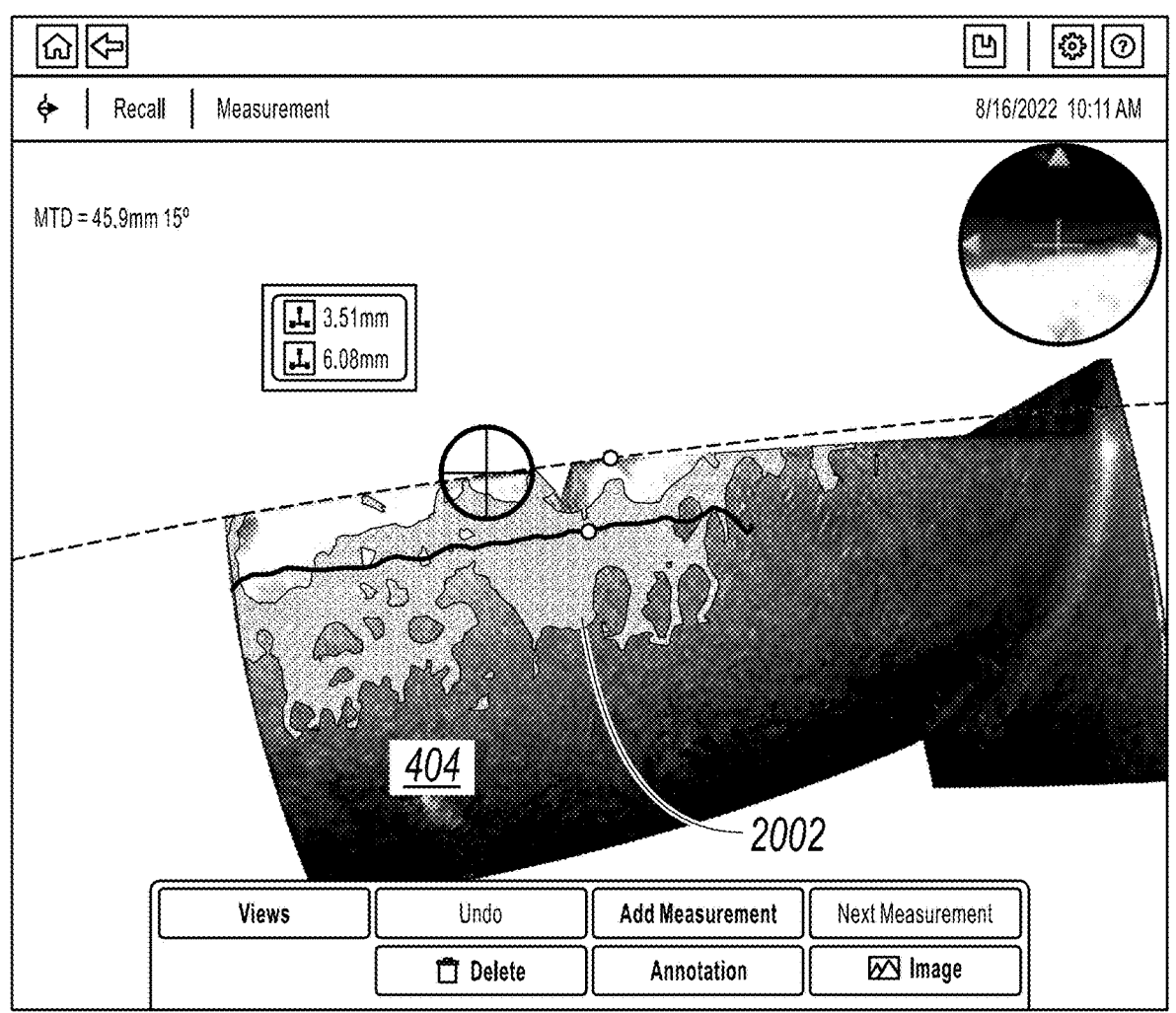
FIG. 19 illustrates an example masking of pixels in the 2D image having associated 3D coordinates that are within a predetermined distance from the exemplary "Blade Edge Nick" measurement's reference plane.

In some implementations, the data processor may identify pixels in the 2D image having associated 3D coordinates that are within a predetermined distance (e.g. 1% of the z value) of the reference plane and highlight or mask those pixels in the 2D image to give the user a visual indication of where the reference plane has been established relative to the blade surface. FIG. 19 shows such an implementation. FIG. 19 highlights the points 2002 in the 2D image having associated 3D coordinates that are within the predetermined distance from the "Blade Edge Nick" measurement's reference plane. Similarly, FIG. 20 highlights the same points 2002 within a rendered 3D view.

Figure 22:
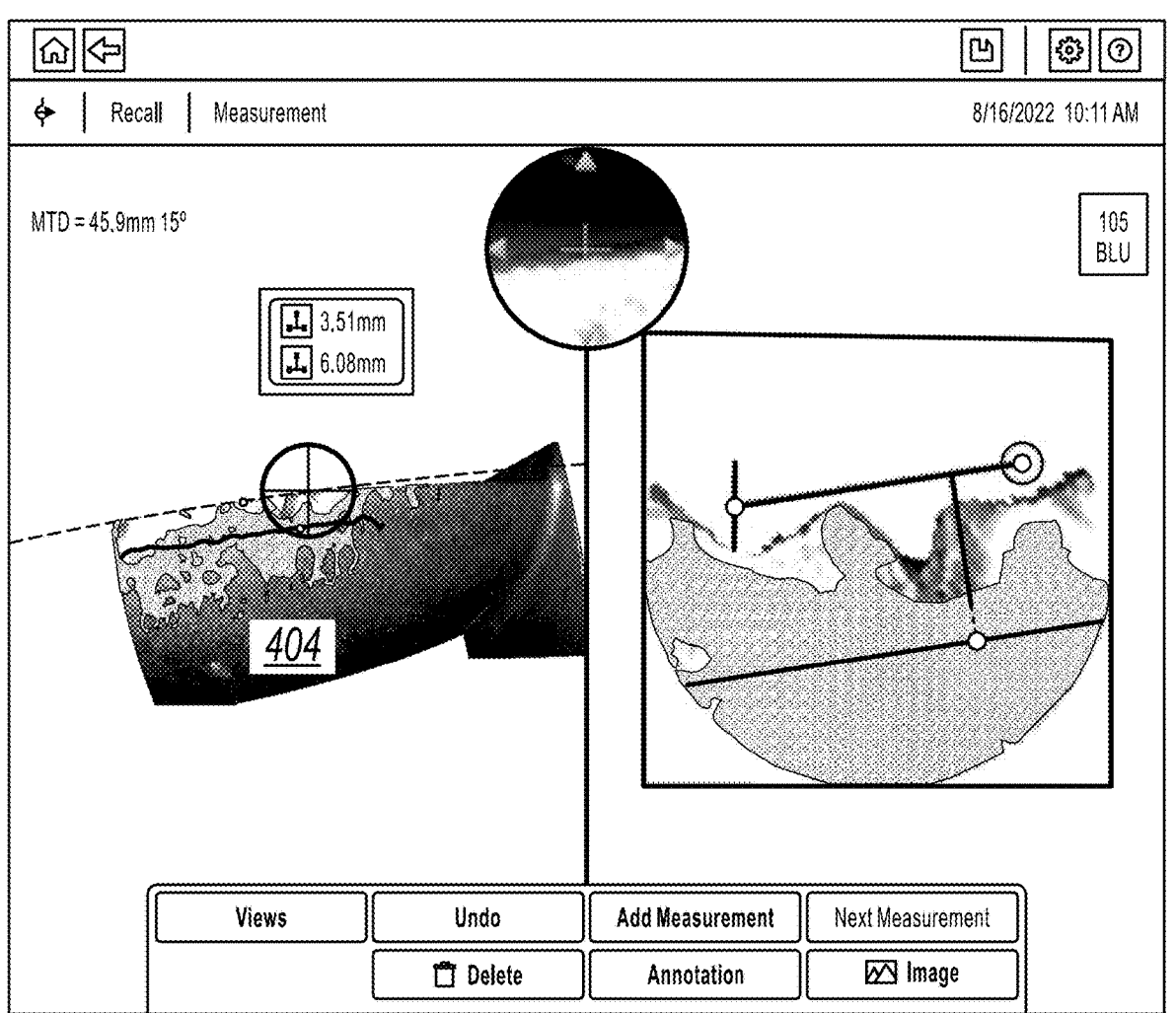
FIG. 22 is an example of an alternate graphical user interface display showing the 2D image on the left and the rendered 3D point cloud view on the right.

In some implementations, the data processor may generate a rendered 3D view, or point cloud, based on the determined 3D coordinates on the surface of the blade. The data processor may also add graphical elements, such as spheres or lines, within the rendered 3D view to indicate the 3D locations of the projected points and/or the reference plane relative to the blade surface. The data processor may send the rendered 3D view to a display where it may be shown alone (FIG. 17) or simultaneously with the 2D image (FIG. 22).

Figure 23:
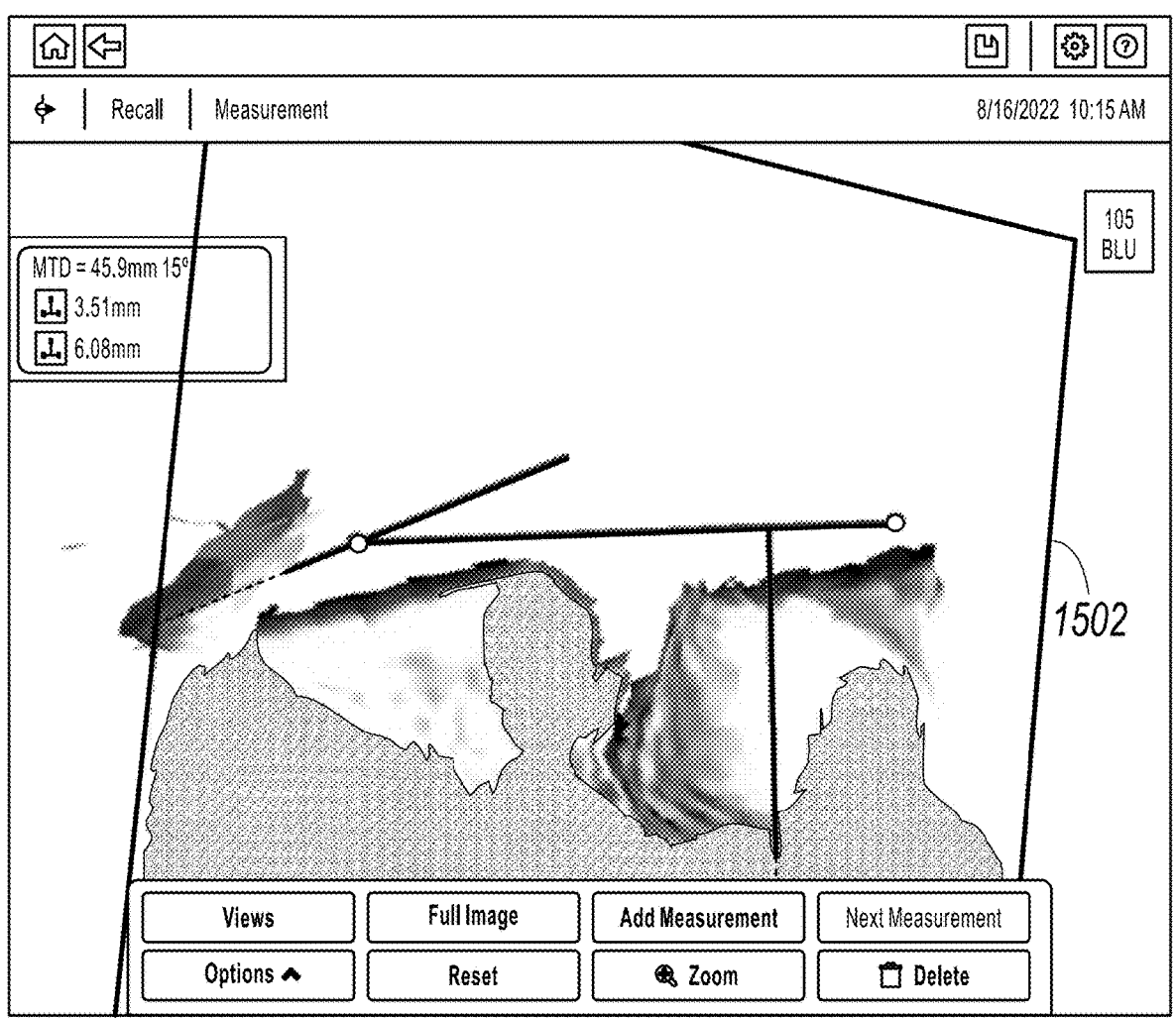
FIG. 23 shows an example Edge View Angle line and its associated Edge View Angle of 15°.
Figure 24:
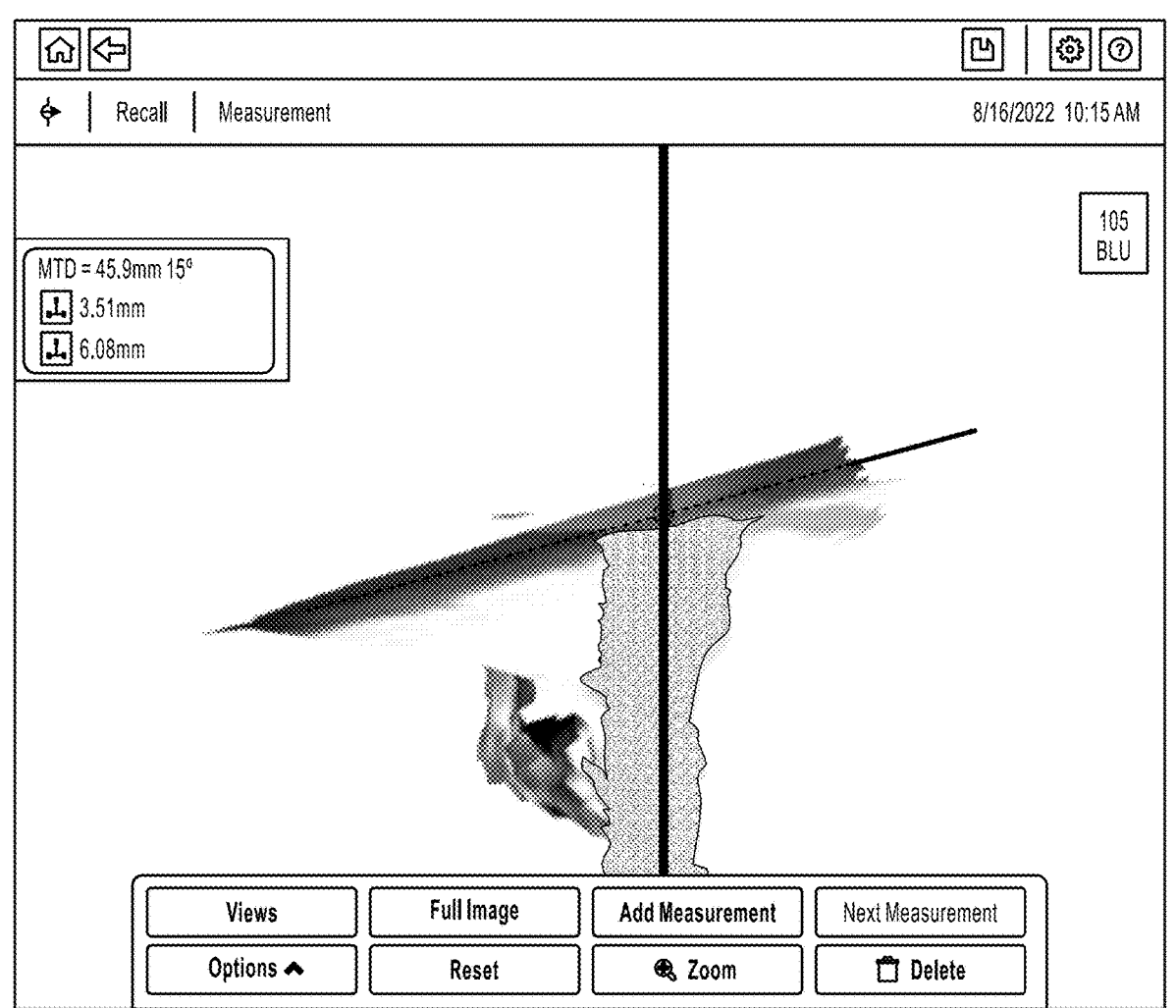
FIG. 24 shows the same Edge View Line as shown in FIG. 23 from an alternate perspective looking parallel to the blade edge.

Some turbine blades may have sharp edges while others may have significantly rounded edges (e.g. a 2 mm radius). When measuring damage near a rounded blade edge, the viewing perspective can significantly affect the measurement results. For example, when the perspective is such that the blade edge is pointed away from the camera of the inspection device, the true blade edge may not be visible in the captured 2D image. The measurement cursors therefore cannot be properly placed on the blade edge. This tends to cause the measured result to be smaller than the actual size of the damage. If the viewing perspective is such that the rounded blade edge is pointed toward the camera, the user may not be able to determine where to properly place the measurement cursors on that rounded blade edge. Furthermore, the projection of those cursors onto the measurement plane of the prior art or the reference plane may result in the projected 3D coordinates associated with the cursors near the blade edge (projected edge points) may be significantly offset from their proper positions on the perpendicular projection of the true blade edge onto the reference plane. Thus in some implementations, the data processor may determine an Edge View Plane containing the projected edge points and the camera's optical original (typically x,y,z=0, 0,0 in the camera's 3D coordinate system) and calculate the angle between the Edge View Plane and the measurement's reference plane as a measure of the difference between the ideal viewing perspective in which this angle would be 90°, and the actual viewing perspective. The data processor may display a value (Edge View Angle) or some other indication derived from this calculated angle. For example, the data processor may display a value of 0° when the angle between the two planes is 90° indicating that the viewing perspective is 0° from the ideal. The data processor may also render within a rendered 3D point cloud view a line that lies on the Edge View Plane and whose projection onto the reference plane is perpendicular to the line defined by the projected edge points (see FIG. 22 and FIG. 23). FIG. 24 shows the same Edge View Line as shown in FIG. 23 from an alternate perspective looking parallel to the blade edge. Note the angle between the Edge View Line and the reference plane 1502. The Edge View Angle of 15° is equal to 90° minus the angle between the reference plane and the Edge View Line.

The systems and methods described herein may be implemented as part of a software application that runs on an inspection device that can support 3D measurement capabilities. It may alternatively be implemented in a software application that runs on any other device having a processor coupled to a memory device such as a laptop or desktop computer, phone, table, server, etc. to measure a feature near the edge of an object in images or data files containing image information captured and saved by a camera system or inspection device wherein the image or data file or files also provide 3D information or data necessary for determining 3D information, such as calibration data, accelerometer data, etc.

Figure 25:
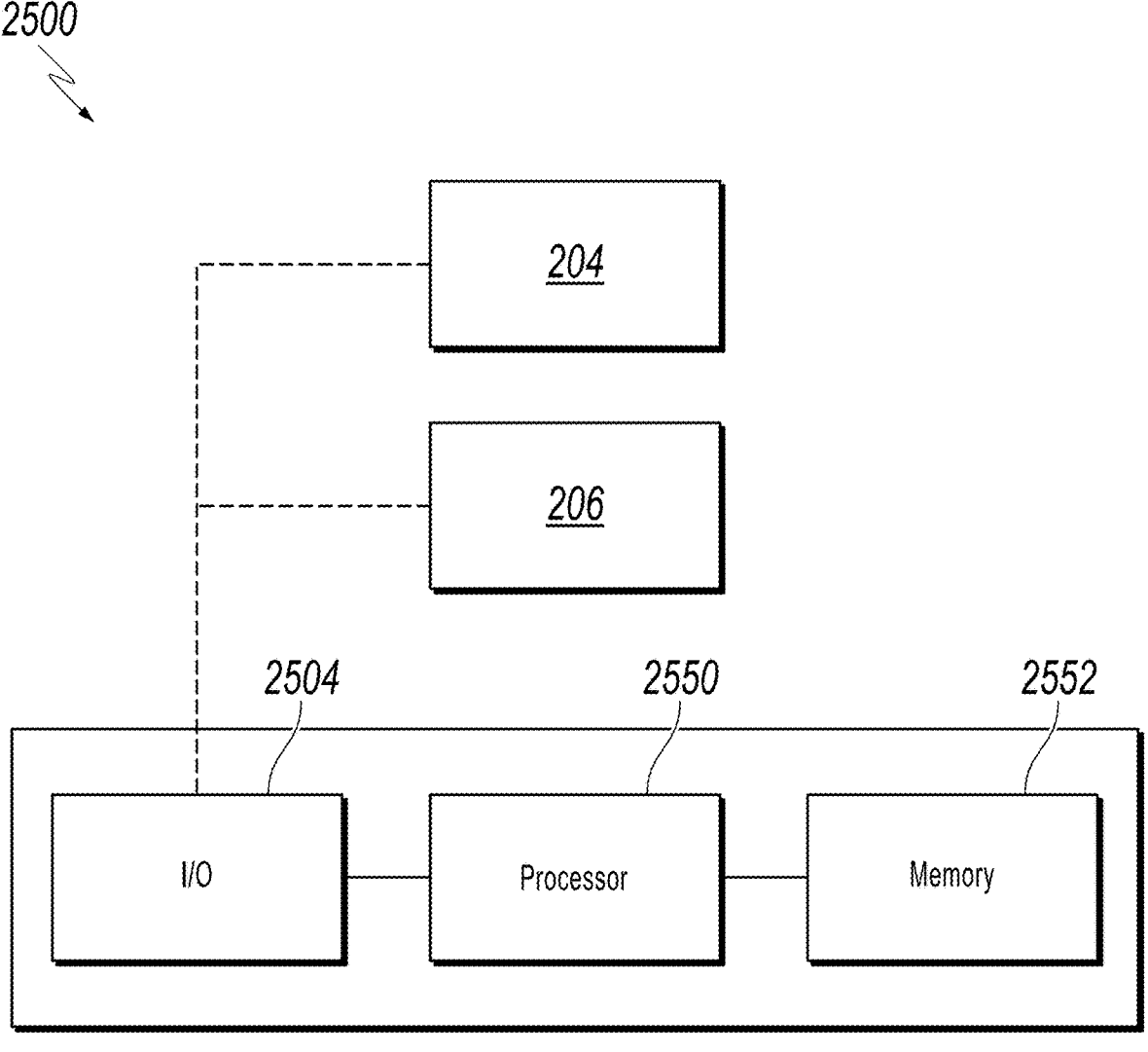
FIG. 25 is a block diagram of a controller that can be used with aspects of this controller.

FIG. 25 illustrates the example controller 2500 that can be used with some aspects of the current subject matter, for example, as the borescope 200. In some implementations, the controller can execute all or part of the method 100 as well as other subject matter described throughout this disclosure. The controller 2500 can, among other things, monitor parameters of a system, send signals to actuate and/or adjust various operating parameters of such systems. As shown in FIG. 25, the controller 2500 can include one or more processors 2550 and non-transitory computer readable memory storage (e.g., memory 2552) containing instructions that cause the processors 2550 to perform operations. The processors 2550 are coupled to an input/output (I/O) interface 2554 for sending and receiving communications with components in the system, including, for example, the display 206 and the tip 204. In some implementations, the I/O interface 2554 can include a wireless communication device. In certain instances, the controller 2500 can additionally communicate status with and send actuation and/or control signals to one or more of the various system components (including, for example, the tip 204) of the borescope 200, as well as other sensors (e.g., pressure sensors, temperature sensors, vibration sensors and other types of sensors) that provide signals to the system.

In some embodiments, source code can be human-readable code that can be written in program languages such as python, C++, etc. In some embodiments, computer-executable codes can be machine-readable codes that can be generated by compiling one or more source codes. Computer-executable codes can be executed by operating systems (e.g., Linux, windows, mac, etc.) of a computing device or distributed computing system. For example, computer-executable codes can include data needed to create runtime environment (e.g., binary machine code) that can be executed on the processors of the computing system or the distributed computing system.

Other embodiments are within the scope and spirit of the disclosed subject matter. For example, the method of determining measurements described in this application can be used in facilities that have complex machines with multiple operational parameters. Usage of the word "optimize"/"optimizing" in this application can imply "improve"/"improving."

Certain embodiments will now be described to provide an overall understanding of the principles of the structure, function, manufacture, and use of the systems, devices, and methods disclosed herein. One or more examples of these embodiments are illustrated in the accompanying drawings.

Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a Read Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back end component (e.g., a data server), a middleware component (e.g., an application server), or a front end component (e.g., a client computer having a graphical user interface or a web interface through which a user can interact with an embodiment of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed:

1. A method comprising:

receiving one or more two dimensional images characterizing an object;

determining a plurality of three-dimensional surface points on the surface of the object based on the images;

identifying an edge of the object;

identifying a point on a perimeter of a feature on the object at a position farthest from the edge of the object;

determining a reference plane based on the identified edge of the object and the three-dimensional coordinates;

determining a three-dimensional reference line on the reference plane associated with the edge of the object;

determining a three-dimensional measurement point on the reference plane based on the point on the perimeter of the feature;

determining a distance between the measurement point and the reference line; and providing the determined distance.

2. The method of claim 1, wherein the one or more two dimensional images comprise a stereo image pair or a structured light image.

3. The method of claim 1, wherein identifying an edge of the object comprises receiving, by a user-input device, a first user interaction designating a first edge point proximate the edge of the object.

4. The method of claim 3, wherein identifying an edge of the object comprises receiving, by the user input device, a second user interaction designating a second edge point proximate the edge of the object.

5. The method of claim 1, wherein identifying an edge of the object comprises applying edge detection techniques to map the edge.

6. The method of claim 1, wherein identifying a point on the perimeter of the feature comprises receiving, by a user input device, a third user interaction designating the position of the point.

7. The method of claim 1, wherein determining a reference plane comprises identifying three or more of the three-dimensional surface points on the surface of the object based on the position of the identified edge of the object.

8. A measurement device comprising:

an image sensor configured to generate two-dimensional image data based on light reflected from a surface of an object;

a display configured to displaying within a graphical users interface a visual representation of the object based on the two dimensional image data;

a user input device;

a processor; and a non-transitory memory coupled to the processor, the non-transitory memory storing instructions to cause the processor to perform operations comprising:

receiving the two dimensional image data from the image sensor;

determining a plurality of three-dimensional surface points on the surface of the object based at least in part on the two dimensional image data;

identifying an edge of the object;

identifying a point on a perimeter of a feature at a position farthest from the edge of the object;

determining a reference plane based on the identified edge of the object and the three-dimensional coordinates;

determining a three-dimensional reference line on the reference plane associated with the edge of the object;

determining a three-dimensional measurement point on the reference plane based on the point on the perimeter of the feature;

determining a distance between the measurement point and the reference line; and providing the determined distance.

9. The measurement device of claim 8, wherein the two dimensional image data comprises a stereo image pair or a structured light pattern.

10. The measurement device of claim 8, wherein identifying an edge of the object comprises receiving via the user input device a first user interaction designating a first edge point proximate the edge of the object.

11. The measurement device of claim 10, wherein identifying an edge of the object comprises receiving via the user input device a second user interaction designating a second edge point proximate the edge of the object.

12. The measurement device of claim 8, wherein identifying an edge of the object comprises applying edge detection techniques to map the edge of the object.

13. The measurement device of claim 8, wherein identifying a point on the perimeter of the feature comprises receiving via the user input device a third user interaction designating the position of the point.

14. The measurement device of claim 8, wherein determining a reference plane comprises identifying three or more of the three-dimensional surface points on the surface of the object based on the position of the identified edge of the object.

15. A non-transitory computer readable memory storing instructions which, when executed by at least one data processor forming part of at least one computing system, causes the at least one data processor to perform operations comprising:

receiving one or more two dimensional images characterizing an object;

determining a plurality of three-dimensional surface points on the surface of the object based on the images;

identifying an edge of the object;

identifying a point on a perimeter of a feature on the object at a position farthest from the edge of the object;

determining a reference plane based on the identified edge of the object and the three-dimensional coordinates;

determining a three-dimensional reference line on the reference plane associated with the edge of the object;

determining a three-dimensional measurement point on the reference plane based on the point on the perimeter of the feature;

determining a distance between the measurement point and the reference line; and providing the determined distance.

16. The non-transitory computer readable memory of claim 15, wherein the one or more two dimensional images comprise a stereo image pair or a structured light image.

17. The non-transitory computer readable memory of claim 15, wherein identifying an edge of the object comprises receiving, by a user-input device, a first user interaction designating a first edge point proximate the edge of the object.

18. The non-transitory computer readable memory of claim 17, wherein identifying an edge of the object comprises receiving, by the user input device, a second user interaction designating a second edge point proximate the edge of the object.

19. The non-transitory computer readable memory of claim 15, wherein identifying an edge of the object comprises applying edge detection techniques to map the edge.

20. The non-transitory computer readable memory of claim 15, wherein identifying a point on the perimeter of the feature comprises receiving, by a user input device, a third user interaction designating the position of the point.

* * * * *